SOUND RECORDING AND REPRODUCING DEVICE

Filed Feb. 23, 1951 2 Sheets-Sheet 1

Inventor
Italo Ninni
By Robert E. Burns
Attorney

Nov. 16, 1954 I. NINNI 2,694,577

SOUND RECORDING AND REPRODUCING DEVICE

Filed Feb. 23, 1951 2 Sheets-Sheet 2

Inventor
Italo Ninni
By Robert E Burns
Attorney 2,694,577

Patented Nov. 16, 1954

1

2

2,694,577

SOUND RECORDING AND REPRODUCING DEVICE

Italo Ninni, Turin, Italy

Application February 23, 1951, Serial No. 212,239

Claims priority, application Italy June 19, 1950

2 Claims. (Cl. 274—4)

Figure 1:
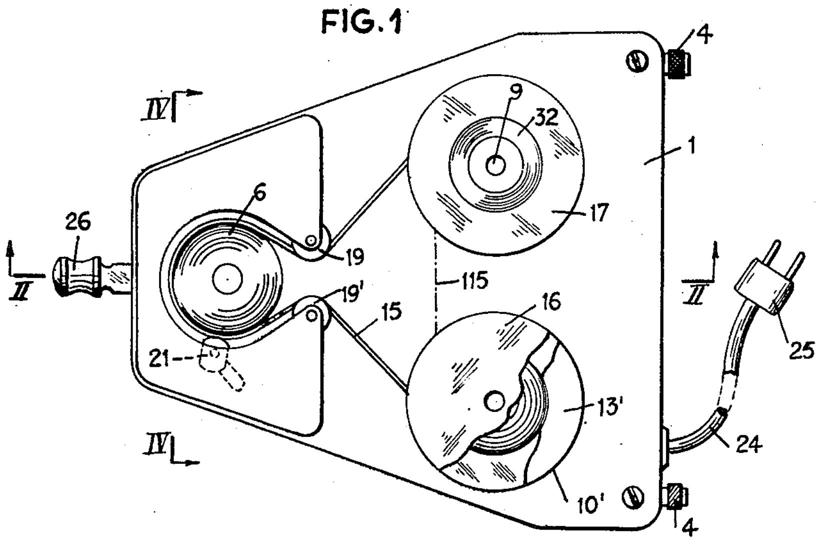

This invention relates to sound recording and reproducing devices, in which the sound record is effected on a linear medium, such as a magnetic wire or tape.

The main object of this invention is to provide a recording device simple and economical in construction, suitable for coupling with a conventional radio receiver, in order to utilize some of the electronic circuits of said receiver for sound recording or reproducing purposes.

Generally, a radio receiver has coupled therewith a phonograph actuated either electrically or by means of spring or similar motors; therefore, it is an object of this invention to provide a recording and reproducing device, more particularly suitable for coupling with the turntable of said phonograph, in order to possibly avoid the use of a special motor for actuating the device and thereby further reduce its cost of manufacture.

A further object of the invention is to provide in said device very simple motion transmitting means, adapted at the same time to afford a substantially constant recording and reproducing rate of speed, notwithstanding variations in effective diameter of the storage spools of the linear medium during operation.

According to this invention, the sound recording and reproducing device comprises a driving spool drivably connected with a suitable motor, a rotatable supporting disc adapted to be driven by said driving spool, a winding spool positioned on and in frictional engagement with said supporting disc, a second supporting disc, a supply spool supported by said second disc and frictionally engaged therewith, a recording linear medium frictionally engaged with the periphery of said driving spool and adapted to be wound upon said winding spool, the angular speed of the winding spool supporting disc being greater than the angular speed of the driving spool, the adherence between said linear medium and the driving spool being greater than the frictional engagement between each storage spool and its supporting disc.

The expression "the adherence between the linear medium and driving spool being greater than the frictional engagement between each storage spool and its supporting disc;" should be understood in the sense that the power transmissible through the coupling driving spool—linear medium is greater than the power transmissible through the coupling, for instance, winding spool-supporting disc, so that the rate of speed of the linear medium at any time substantially equals the peripheral speed of the driving spool, while the winding spool continuously slips on its supporting disc.

The three spools are preferably arranged on a horizontal plane, so that the frictional coupling between the two storage spools and their respective supporting discs is due mainly to the spools' own weight, aside from the nature of the contact surfaces and their area.

According to a further feature, the driving spool and the two supporting discs are arranged on a common base adapted to be placed on the gramophone upper frame plate, in such manner that the driving spool will be coaxial with the turntable and coupled therewith for driving purposes, means being provided for rapidly effecting said coupling.

Figure 2:
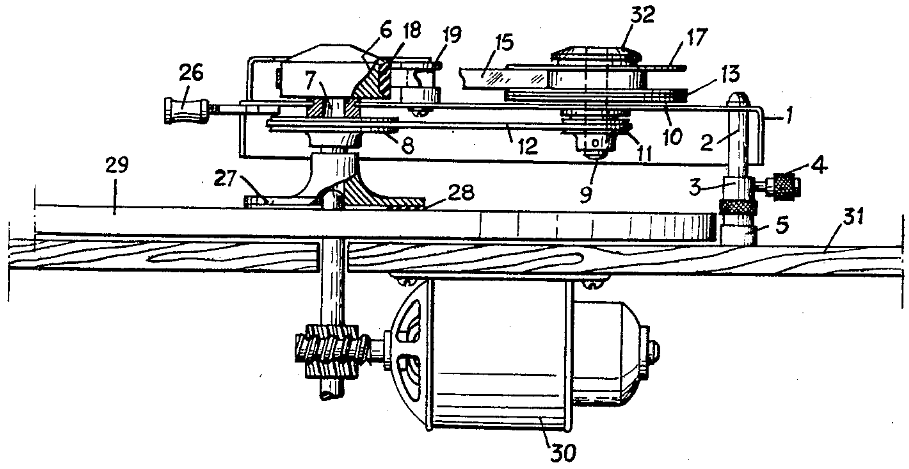
Figure 3:
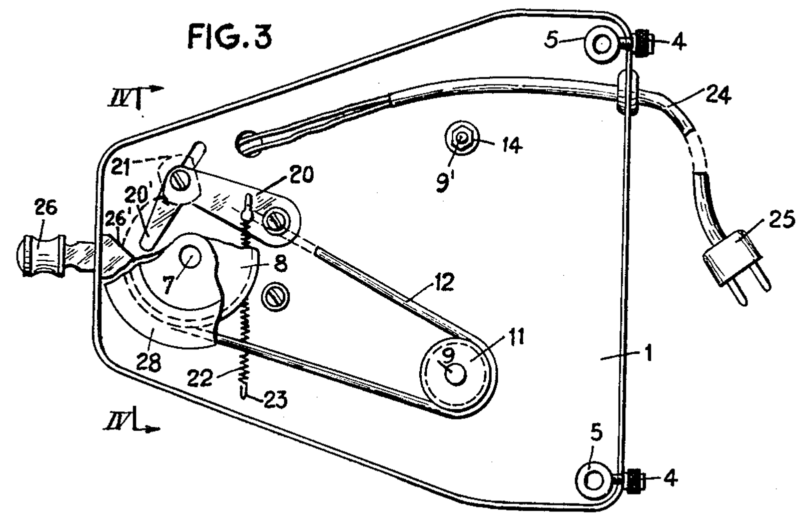
Figure 4:
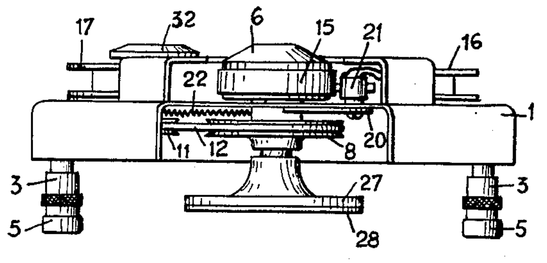
Figure 5:
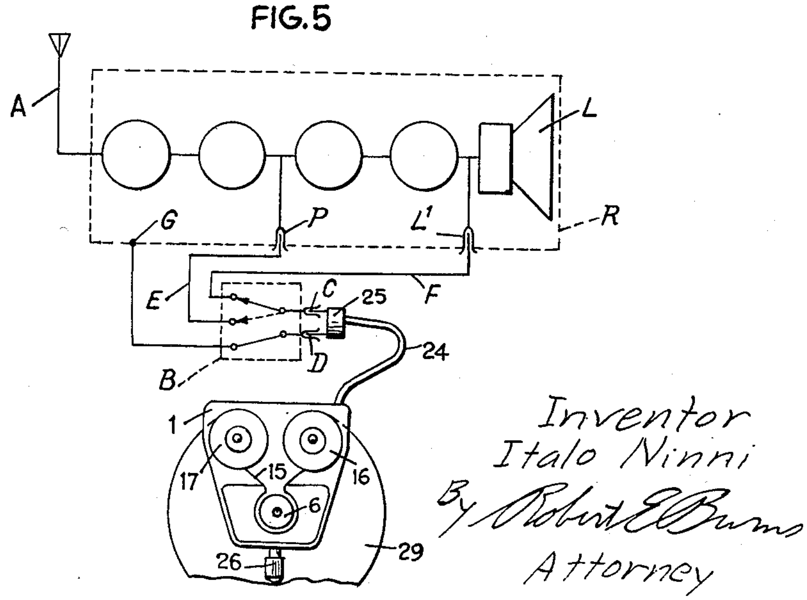

The invention shall be better understood from the following description of a preferred embodiment of the recording and reproducing device shown in the appended drawings, in which Figure 1 is a plan view, Figure 2 is a section on line II—II of Figure 1, Figure 3 is a view from below, Figure 4 is a section on line IV—IV of Figures 1 and 3, Figure 5 is a wiring diagram showing the connection with a radio receiver.

On the drawing, 1 denotes a horizontal base in the form of a trapezoidal casing provided with two vertical supporting pins 2. Said pins 2 each end by a slidable sleeve 3 provided with a locking screw 4 for adjustment in height of a side of the base 1. Preferably, each sleeve 3 ends by a pad 5 of rubber or the like, adapted to prevent accidental horizontal displacements of the base 1 with respect to a supporting surface during operation of the device.

6 denotes a driving spool mounted on a shaft 7 rotatable with respect to the base 1 and provided with a grooved pulley 8.

A further shaft 9 is rotatably mounted in the base 1 and carries at its upper portion a disc 10 and at its lower end a grooved pulley 11 coupled with the pulley 8 by means of a belt 12, the diameter of the pulley 11 being conveniently smaller than the diameter of the pulley 8. A layer 13 of cloth, felt or the like is glued to the upper face of the disc 10.

A similar disc 10', lined with a layer 13' of felt, is secured to the base 1 by means of its pin 9' and a nut 14, so as to keep the disc 10' against rotation. The pins 9, 9' of the discs 10, 10', respectively, project above by an extent preferably greater than the thickness of a storage spool of the linear recording medium. In the construction shown, said linear medium is in the form of a magnetizable tape 15, which unwinds from a supply spool 16 placed on the disc 10' and is wound on a winding spool 17 placed on the disc 10. The two spools 16 and 17 are identical with each other and may be interchanged on their supporting discs without affecting operation of the device. On passing from a spool to the other, the tape 15 is partly engaged by the periphery of the driving spool 6 provided with a lining 18 of rubber or other material having a high friction coefficient with respect to the tape 15. Two grooved rollers 19, 19' serve for guiding the tape 15 at a constant level.

The shaft of the roller 19' has mounted thereon, within the base 1, a bell crank lever 20 carrying a magnetic head 21 and constantly drawn towards the shaft 7 by a weak spring 22 anchored at 23 to the base 1 (Figure 3). The magnetic head 21 is fed over a bipolar cable 24 ending by a contact plug 25.

The free end 20' of the lever 20 cooperates with a pull-and-push button 26 radially movable with respect to the shaft 7 of the driving spool so that, when said button is pressed inwardly of the device, its inclined face 26' engages the end 20' of the lever 20 removing said lever from the shaft 7. The magnetic head is then removed from the periphery of the driving spool 6.

The opposite movement of the button 26 returns the lever 20 to its primitive position, as shown in Figures 3 and 4, so that the magnetic head 21 is applied by a slight pressure against the surface of the tape 15.

Preferably, the size and position of the magnetic head 21 are such that it is possible to effect on the tape 15 a first record along the whole lower tape half (Figure 4) and a further record on the other tape half, after having interchanged and reversed the two spools 16 and 17 on their supporting discs 10, 10'.

The lower end of the shaft 7 has fixed thereto a disc 27, of which the lower face is lined with a layer of rubber 28 or other suitable material. In operation, the disc 27 is applied to the centre of the turntable 29 of a phonograph actuated, for instance, by an electric motor 30. The supporting pins 2 and their associated sleeves 3 bear on the upper frame plate 31 of the phonograph and rotation of the turntable 29 is transmitted to the driving spool 6 and supporting disc 10 of the winding spool 17. By effect of the difference in diameter of the pulleys 8 and 11, the rotational speed of the disc 10 is greater than that of the driving spool 6.

By admitting as a known datum the weight of a spool with the tape 15 fully wound thereon, it is always possible to design the individual parts of the device in such manner that the adherence between the tape 15 and driving spool 6 will be in any case greater than the adherence between any of the spools 16, 17 and its respective supporting disc 10, 10'. Consequently, notwithstanding the relatively rapid rotation of the disc 10 of the winding spool 17, the tape 15 shall perform a uniform movement at a speed equalling the peripheral speed of the driving spool, while the winding spool 17 shall be continuously braked with respect to its supporting disc 10 by means of the same tape 15. In other words, during operation of the device, the spool 17 and its supporting disc 10 form a sort of a slip coupling in which the slipping rate gradually increases as the tape 15 is wound on the spool.

The supply spool 16 operates in a similar manner, with the difference that its supporting disc 10' is constantly stationary, so as to oppose a resistance against slipping of the spool 16, said resistance stretching the rear portion of the tape 15.

It will be obvious that the device described above may be provided with a motor of its own suitably coupled with the driving spool 6, which may be particularly useful for use where a phonograph is not available.

In many cases, in order to go over from recording to reproducing, the linear medium requires to be previously re-wound, as in the case, for instance, of narrow magnetic tapes or magnetic wire. The device according to this invention may considerably accelerate re-winding. For this purpose, the spool to be loaded is placed on the rotatable disc 10 and the spool to be unwound is placed on the stationary disc 10' (Fig. 1). The linear medium is attached to the spool to be loaded, without passing it about the driving spool 6, so that the linear medium takes the position shown at 115, Fig. 1. Finally, a weight 32 (Figures 1 and 2) is applied to the spool to be loaded, said weight being such as to prevent slipping between said spool and its supporting disc 10. On starting the motor 30, the disc 10 and its spool are rapidly rotated, discharging the linear medium from the supply spool which slips on its supporting disc 10'.

In the diagram shown in Figure 5, the dash line R denotes the metallic assembly base of a radio receiver provided with a loud-speaker L and an aerial A. Generally, all radio receivers are further provided with a plug contact $L^1$ for an auxiliary loud-speaker, a plug contact P for a pick-up and a third plug contact G for earthing the mass R, which is, as usual, but seldom used.

B denotes an adaptor switch having two inlet plug contacts C and D for fitting the plug 25 of the above described recording device. The plug contact D is constantly connected at G to the mass R, while the plug contact C may be alternatively brought into contact with the ends of two leads E, F, respectively, connected with the plug contacts P and $L^1$.

When the plug contact C is connected to the lead F, the magnetic head 21 operates as a recording head, so that current oscillations in F produce the variable magnetization of the tape 15. The intensity of the magnetizing effect is adjustable by means of the usual volume control of the radio set.

In order to reproduce sound, the contact C is connected with the head cable E, so that the magnetic head 21 operates now as a reproducing head. The intensity of sound is again adjustable by means of the volume control of the radio receiver.

It will be obvious that the device as described may be provided with an erasing head incorporated with the casing 1, or erasing may be effected by means of a wholly independent device.

It is to be understood that a number of modifications and changes in the details of construction as illustrated and described may be resorted to, which will fall within the scope of the invention as claimed.

What I claim is:

1. A magnetic sound recorder adapted to be used as an accessory on a phonograph having a turntable and a supporting platform, comprising an approximately triangular horizontal frame of which one corner is herein designated as the vertex and the opposite side as the base, a vertical shaft rotatably supported near the vertex of said frame, an annular friction disc fixed on the lower end of said shaft and adapted frictionally to engage an annular central area of the surface of said turntable, a driving spool fixed on an upper portion of said shaft and adapted frictionally to engage and thereby drive a linear magnetizable medium, two reel supports near the opposite corners of the base of said frame for supporting respectively a supply reel and a winding reel for said linear medium, said winding reel support being rotatable, driving connections between said winding reel support and said shaft to drive said winding reel support at a rotational speed higher than that of said shaft, cut-away guide means between said reel supports and said driving spool and spaced apart a distance less than the diameter of the driving spool to guide said linear medium in its path of travel and keep it at the level of said reels and the driving portion of the driving spool, and vertically adjustable legs extending downwardly from said frame adjacent the opposite corners of the base thereof and adapted to rest on said platform, and feet on said legs having a high coefficient of friction and adapted frictionally to engage said platform to prevent rotation of said frame by said turntable, said legs being individually adjustable to align said shaft with the axis of rotation of said turntable.

2. A magnetic sound recorder according to claim 1, in which each of said legs and its associated foot comprises a post fixed to said frame and extending downwardly therefrom, a sleeve telescopically slidable on said post, a foot portion of rubber composition on said sleeve and means for securing said sleeve in selected position on said post.

References Cited in the file of this patent

UNITED STATES PATENTS

| Number | Name | Date |
|---|---|---|
| 1,533,561 | Lindner | Apr. 14, 1925 |
| 1,758,559 | Croll | May 13, 1930 |
| 1,930,544 | Victor | Oct. 17, 1933 |
| 2,304,913 | Herzig | Dec. 15, 1942 |
| 2,364,556 | Somers | Dec. 5, 1944 |
| 2,401,530 | Vought | June 4, 1946 |
| 2,490,771 | Begun | Dec. 13, 1949 |
| 2,535,498 | Kornei | Dec. 26, 1950 |
| 2,539,858 | offutt | Jan. 30, 1951 |
| 2,542,590 | Stone | Feb. 20, 1951 |
| 2,553,392 | Van Eps | May 15, 1951 |
| 2,555,643 | Harrison | June 5, 1951 |